United States Patent
Ieda

(10) Patent No.: US 8,064,772 B2
(45) Date of Patent: Nov. 22, 2011

(54) OPTICAL SPACE TRANSMITTER AND OPTICAL SPACE TRANSMISSION METHOD FOR WAVELENGTH-MULTIPLEXED LIGHT

(75) Inventor: Tomoaki Ieda, Osaka (JP)

(73) Assignee: Panasonic Corporation, Osaka (JP)

( * ) Notice: Subject to any disclaimer, the term of this patent is extended or adjusted under 35 U.S.C. 154(b) by 908 days.

(21) Appl. No.: 11/579,831

(22) PCT Filed: Feb. 2, 2006

(86) PCT No.: PCT/JP2006/301767
§ 371 (c)(1),
(2), (4) Date: Nov. 7, 2006

(87) PCT Pub. No.: WO2006/082893
PCT Pub. Date: Aug. 10, 2006

(65) Prior Publication Data
US 2007/0242958 A1    Oct. 18, 2007

(30) Foreign Application Priority Data
Feb. 7, 2005  (JP) .................................. 2005-030064

(51) Int. Cl.
*H04B 10/00*    (2006.01)
*H04J 14/02*    (2006.01)
(52) U.S. Cl. ......................................... 398/118; 398/96
(58) Field of Classification Search .................. 398/186, 398/91, 96, 118–131; 355/67, 53; 359/172, 359/152
See application file for complete search history.

(56) References Cited

U.S. PATENT DOCUMENTS

| | | | | |
|---|---|---|---|---|
| 5,678,097 A * | 10/1997 | Suda | .............................. | 396/113 |
| 5,777,768 A * | 7/1998 | Korevaar | ...................... | 398/129 |
| 5,986,787 A * | 11/1999 | Ohshima et al. | .............. | 398/127 |
| 6,181,853 B1 * | 1/2001 | Wade | .............................. | 385/37 |
| 6,236,480 B1 * | 5/2001 | Atlas | ................................. | 398/9 |
| 6,960,009 B2 * | 11/2005 | Shinohara et al. | ............. | 362/601 |
| 7,283,233 B1 * | 10/2007 | Ho et al. | ........................ | 356/328 |
| 7,389,051 B2 * | 6/2008 | Morioka et al. | .............. | 398/127 |
| 2002/0163699 A1 * | 11/2002 | Kavehrad et al. | ............. | 359/172 |
| 2002/0167701 A1 | 11/2002 | Hirata | | |
| 2003/0223036 A1 | 12/2003 | Anderson et al. | | |
| 2004/0233411 A1 * | 11/2004 | Shiraishi | ......................... | 355/67 |
| 2004/0247323 A1 | 12/2004 | Morioka et al. | | |
| 2007/0177880 A1 * | 8/2007 | Karasikov et al. | ............. | 398/170 |

FOREIGN PATENT DOCUMENTS

| | | |
|---|---|---|
| JP | 58-125925 | 7/1983 |
| JP | 62-058938 | 4/1987 |
| JP | 63-151230 | 6/1988 |

(Continued)

*Primary Examiner* — Shi K Li
(74) *Attorney, Agent, or Firm* — Wenderoth, Lind & Ponack, L.L.P.

(57) ABSTRACT

Provided is an optical space transmitter and an optical space transmission method, for wavelength-multiplexed light, capable of obtaining a wavelength-multiplexed signal by multiplexing optical signals having a plurality of wavelengths with a simple configuration and without requiring highly precise adjustment for optical axes and enhancing safety for a human body. The transmitter has a configuration for which light sources for outputting signal lights having wavelengths different from each other are arranged so as to irradiate an approximately identical portion of a diffusion plate, a diffuse light outputted from the diffusion plate is converted, by a radiation lens, into a light traveling with an angle suitable for transmission in a free space, and the converted light is passed out to the free space.

12 Claims, 12 Drawing Sheets

FOREIGN PATENT DOCUMENTS

| | | |
|---|---|---|
| JP | 05-308327 | 11/1993 |
| JP | 08-202247 | 8/1996 |
| JP | 09-018423 | 1/1997 |
| JP | 11-095880 | 4/1999 |
| JP | 11-234210 | 8/1999 |
| JP | 2001-036900 | 2/2001 |
| JP | 2001-308797 | 11/2001 |
| JP | 2002-290335 | 10/2002 |
| JP | 2003-318836 | 11/2003 |
| JP | 2004-524067 | 8/2004 |
| JP | 2004-363756 | 12/2004 |
| WO | 02/49721 | 6/2002 |

\* cited by examiner

F I G. 1 8
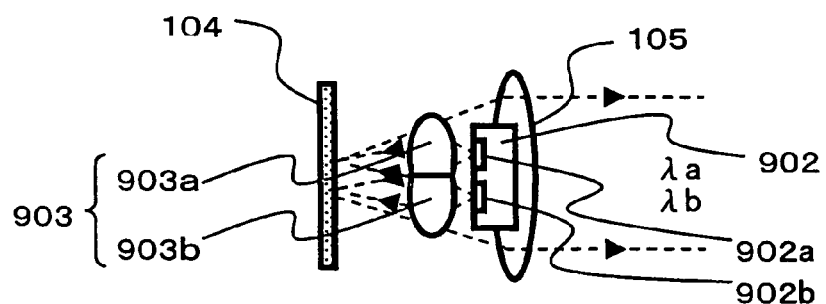

OPTICAL SPACE TRANSMITTER AND OPTICAL SPACE TRANSMISSION METHOD FOR WAVELENGTH-MULTIPLEXED LIGHT

TECHNICAL FIELD

The present invention relates to an optical space transmitter and an optical space transmission method, for optical signals, for transmitting information data such as a video signal, an audio signal, and a digital data signal as an optical signal via a free space. More specifically, the present invention relates to an optical space transmitter and an optical space transmission method, for wavelength-multiplexed light, for multiplexing optical signals having a plurality of wavelengths and transmitting the multiplexed optical signal to an optical receiver via a free space.

BACKGROUND ART

An optical space transmission system for transmitting an optical signal between an optical transmitter and an optical receiver via a free space has been in practical use. However, there is a gradual trend of increasing the capacity of a signal and such a signal is to be transmitted with high speed, and thus, a high speed transmission and large capacity are also required for an optical space transmission system. Signals to be transmitted include data, image, and sound, and, in some cases, these different signals are simultaneously transmitted. In order to adapt the requests for high-speed transmission, large capacity, and simultaneous transmission of a plurality of signals, a space transmission system for wavelength-multiplexed light has been proposed; the space transmission system being for wavelength multiplexing optical signals having a plurality of wavelengths and for transmitting the wavelength-multiplexed optical signal.

There exists a conventional wavelength multiplexing optical space transmission system in which optical signals having wavelengths different from each other are multiplexed by using a plurality of dichroic mirrors in an optical transmitter of the system (for example, see Patent Document 1). FIG. 19 shows a configuration of a conventional wavelength multiplexing optical space transmitter described in Patent Document 1.

In FIG. 19, light emitting elements 52a to 52d send out optical signals having wavelengths different from each other. A dichroic mirror section 54a has characteristics of allowing to pass through a light having wavelength λ1 and reflecting a light having wavelength λ2 by a reflection surface placed in the middle thereof. Accordingly, the light having wavelength λ1 sent from the light emitting element 52a and the light having wavelength λ2 sent from the light emitting element 52b are thereby multiplexed. Also, a dichroic mirror section 54b has characteristics of allowing to pass through a light having wavelength λ1 or λ2 and reflecting a light having wavelength λ3 by a reflection surface placed in the middle thereof. Accordingly, the light having wavelength λ1 and the light having wavelengths λ2 respectively sent from the light emitting elements 52a and 52b and the light having wavelength λ3 sent from the light emitting element 52c are thereby multiplexed. Through sequentially multiplexing light as described above, a wavelength-multiplexed optical signal whose optical axes therein are aligned is generated.

On the other hand, there exists a conventional optical space transmitter in which safety of a transmission light is enhanced by using a diffusion plate (for example, see Patent Document 2). FIG. 20 shows a conventional optical space transmitter described in Patent Document 2.

In the apparatus shown in FIG. 20, a transmission light sent from a light source 61 is converted into a non-convergent type diffuse light by a reflective diffusion plate 64, thereby enhancing safety when a human body, especially the eyes, are exposed to an optical signal transmitted via a free space.

[Patent Document 1] Japanese Laid-Open Patent Publication No. 63-151230 (pages 6 to 8, FIG. 1)

[Patent Document 2] Japanese Laid-Open Utility Model Publication No. 62-58938 (page 1, FIG. 2)

However, in the conventional configuration shown in FIG. 19, it is necessary to have a plurality of dichroic mirror sections 54a to 54c having different characteristics, leading to an increase in types and the number of constituent parts, which in turn causes difficulties in downsizing and cost reduction. Also, a reflection direction of light changes according to an incident angle thereof for each of the dichroic mirror sections 54a to 54c. Therefore, when directions of light entering the dichroic mirror sections 54a to 54c differ from each other or orientations of the dichroic mirror sections 54a to 54c differ from each other, optical axes in a signal obtained after multiplexing are displaced out of alignment. Accordingly, a highly precise angle adjustment for optical axes is required to align optical axes of a plurality of optical signals, causing problems of an increase in man-hours for manufacture and cost.

The conventional configuration shown in FIG. 20 is for enhancing safety in a case where a human body, especially the eyes, are exposed to an optical signal transmitted via a free space, and not intended to achieve a high speed transmission in the optical space transmission system by wavelength multiplexing. Also, in order to enhance safety in the conventional configuration shown in FIG. 19, it is necessary to further include a configuration such as shown in FIG. 20.

The present invention is made to solve the above-described conventional problems, and an object thereof is to provide an optical space transmitter and an optical space transmission method, for multiplexed optical light, capable of obtaining a wavelength-multiplexed signal by multiplexing optical signals having a plurality of wavelengths with a simple configuration and without requiring highly precise angle adjustment for optical axes, and for enhancing safety for a human body including, e.g., the eyes.

SUMMARY OF THE INVENTION

To achieve the above objects, the present invention has the following aspects. A wavelength multiplexing optical space transmitter of the present invention is a wavelength multiplexing optical space transmitter for multiplexing optical signals having a plurality of wavelengths and transmitting the multiplexed optical signal via a free space, includes a plurality of light sources for outputting lights each having a wavelength different from each other and a diffusion plate for diffusing each of the lights which enter from the plurality of light sources for outputting a diffuse light, and has a configuration in which the plurality of light sources are arranged such that the lights outputted to the diffusion plate irradiate areas overlapping each other, and the diffuse light outputted from the diffusion plate is radiated as a multiplexed optical signal into the free space.

According to the present invention, a single diffusion plate is used to multiplex a plurality of optical signals having different wavelengths outputted from the plurality of light sources. Also, an optical signal to be radiated into a free space is converted into a light safe for a human body by diffusing the light with the diffusion plate. Accordingly, a wavelength-multiplexed optical transmitter for generating and transmitting a wavelength-multiplexed light safe for a human body can be realized with a simple configuration.

Operations will be described in detail. In the present invention, light from a light source is diffused by the diffusion plate. Accordingly, a diffuse light is obtained. The diffuse light is light reduced in coherence and directivity. As a result, focusability of the light is reduced and energy density thereof is also reduced. Here, the focusability indicates a property of likeliness of light entering a lens or the like and being outputted from the lens or the like to focus on a spot having a small diameter. Accordingly, even when a laser light source is used, light undergoes a diffusion process, so that focusability and energy density thereof is reduced, enhancing safety of light outputted to the free space, for a human body, especially for the eyes. Light such as a laser light having a high focusability and energy density is dangerous to the eyes, and therefore, conventionally, the light had to be outputted with a reduced intensity. However, if the light is converted such that the focusability and the energy density thereof is reduced so as to be safe and then outputted to a free space as in the present invention, a high intensity light can be outputted from a light source, thereby enhancing a communication speed. Additionally, reducing directivity of light leads to a relatively large diameter of a luminous flux at a reception side, thereby enhancing receivability in a receiver. Also, in the present invention, a plurality of lights having different wavelengths are multiplexed simultaneous to performing a light diffusion with the diffusion plate. Accordingly, it is possible to generate a wavelength-multiplexed signal light with a remarkably simple configuration and to further enhance a communication speed. A single diffusion plate may be sufficient at least.

In the present invention, it is preferable that the diffusion plate is formed with a light diffusing material for causing an output power of a diffuse light which is in a direction perpendicular to a surface of the diffusion plate to be maximum.

Also, in the present invention, it is preferable that the diffusion plate is formed with a light diffusing material for outputting a diffuse light with a light intensity distribution corresponding to a Lambertian distribution.

Through having the above-described characteristics, a large optical output can be obtained in a direction approximately perpendicular to a surface of the diffusion plate for all optical signals which enter from a plurality of light sources, whereby it is possible to obtain a multiplexed optical signal whose optical axes therein are aligned.

Also, in the present invention, it is preferable that a diffuse light, in a direction approximately perpendicular to a surface of the diffusion plate, of the diffuse light outputted from the diffusion plate is radiated as the optical signal into the free space.

Through having the above-described characteristics, a diffuse light in the vicinity of a perpendicular direction where a radiation power density is maximum can be used, whereby the diffuse light from the diffusion plate can be efficiently radiated into the free space.

Also, in the present invention, it is preferable that lights from the plurality of light sources to the diffusion plate are caused to enter from a direction other than a range of directions approximately perpendicular to the surface of the diffusion plate.

Through having the above-described characteristics, the plurality of light sources do not intercept a travel of the diffuse light in the vicinity of a perpendicular direction where a radiation power density is maximum, whereby the diffuse light from the diffusion plate can efficiently radiate into the free space.

Also, in the present invention, it is preferable that the diffusion plate is a reflective type diffusion plate for diffuse-reflecting an entered light for output.

Through having the above-described characteristics, a diffuse reflection light can be obtained with a simple configuration, the diffuse reflection light being the optical signals, of different wavelengths from a plurality of light sources, having been multiplexed.

Also, in the present invention, it is preferable that the diffusion plate is a transmissive type diffusion plate for diffuse-transmitting an entered light for output and that the diffuse transmission light outputted from the transmissive type diffusion plate is radiated into the free space.

Through having the above-described characteristics, it is possible to obtain a diffuse transmission light with a simple configuration, the diffuse transmission light being optical signals, of different wavelengths from a plurality of light sources, having been multiplexed.

Also, in the present invention, it is preferable that a radiation lens is provided, separate from the diffusion plate, on a side where the diffuse light is outputted so that the diffuse light is caused to enter the radiation lens and a spread angle of the diffuse light is adjusted thereby.

Through having the above-described characteristics, a spread angle of an output light from the diffusion plate can be adjusted to an angle appropriate for transmission.

Also, in the present invention, it is preferable that each of the plurality of light sources includes a light emitting element and a light source lens for converting an output light from the light emitting element into a substantially parallel light.

Through having the above-described characteristics, a distance between the light emitting element and the diffusion plate can be flexibly set.

Also, in the present invention, it is preferable that the plurality of light sources are arranged in an approximate circle.

Through having the above-described characteristics, a large number of light sources can be mounted in a small space.

Also, in the present invention, it is preferable that the radiation lens and the light source lens are formed in one piece.

Through having the above-described characteristics, it is possible to reduce the number of constituent parts.

Also, in the present invention, it is preferable that the plurality of light sources include a light emitting element array for which a plurality of light emitting sections are formed in one piece and with a lens array arranged correspondingly to the plurality of light emitting sections of the light emitting element array.

Through having the above-described characteristics, the plurality of light sources can be unified, thereby obtaining a simple configuration.

Also, in the present invention, it is preferable that the plurality of light sources are arranged to positions axially-asymmetric with respect to an axis passing through a position irradiated on the diffusion plate by the plurality of light sources and perpendicular to a surface of the diffusion plate.

Through having the above-described characteristics, a light from a light source can be prevented from entering the plurality of light sources of another when reflected, thereby preventing a noise increase due to entering of the reflected light.

Also, in the present invention, it is preferable that the plurality of light sources each outputs a light whose far-field pattern is an ellipse shape, and the plurality of light sources are arranged so as to be tilted, with respect to an axis perpendicular to a surface of the diffusion plate, in a direction of a minor axis of the far-field pattern of the ellipse shape.

Through having the above-described characteristics, a pattern of light entering the diffusion plate can be in an approximate circle on the diffusion plate, thereby obtaining distribution of a transmission light appropriate for optical space transmission.

Also, in the present invention, it is preferable that a pair of light sources, among the plurality of light sources, are arranged in a direction to which polarization planes of lights outputted therefrom are orthogonal to each other, the pair of light sources being arranged to positions substantially axially-symmetric to each other with respect to an axis which passes through a place irradiated on the diffusion plate by the plurality of light sources and is perpendicular to a surface of the diffusion plate.

Through having the above-described characteristics, even when light reflected by the diffusion plate enters a light source positioned symmetrical to the other light source, it is possible to prevent an optical coupling (interference) between an output light from the other light source and the reflecting light entering the light source. Accordingly, noise increase due to entering of a reflecting light can be prevented.

A wavelength-multiplexing optical space transmission method of the present invention is a wavelength-multiplexing optical space transmission method for multiplexing optical signals having a plurality of wavelengths and transmitting the multiplexed optical signals via a free space, comprises: an output step of outputting, from a plurality of light sources, lights having wavelengths different from each other; and a diffusion step of diffusing each of the lights which enter from the plurality of light sources by a diffusion plate and outputting a diffuse light, and has a configuration in which, in the output step, the lights from the plurality of light sources irradiate areas, on the diffusion plate, overlapping each other, and, in the diffusion step, the diffuse light is radiated as a multiplexed optical signal into the free space.

According to the present invention, a plurality of optical signals having different wavelengths outputted from a plurality of light sources are multiplexed by the single diffusion plate. Also, an optical signal to be radiated into a free space is converted into a light which is safe for a human body by diffusing the light with the diffusion plate. Accordingly, a wavelength-multiplexing optical transmission method for generating and transmitting a wavelength-multiplexed light safe for a human body can be realized with a simple configuration.

According to the wavelength-multiplexing optical space transmitter, with a simple configuration using a single diffusion plate and without requiring a highly precise angle adjustment for optical axes, optical signals having wavelengths different from each other sent from a plurality of light sources can be multiplexed to obtain an optical signal whose optical axes therein are aligned, thereby generating a wavelength-multiplexed signal light. Also, without providing a separate optical system for enhancing safety, a conversion to obtain a diffuse light having enhanced safety can be simultaneously performed.

BRIEF DESCRIPTION OF THE DRAWINGS

FIG. 18 shows a side view of a configuration of the fifth example of the wavelength multiplexing optical space transmitter according to Embodiment 1 of the present invention.

FIG. 19 is a configuration diagram of a conventional wavelength multiplexing optical space transmitter.

DESCRIPTION OF THE REFERENCE CHARACTERS

Figure 1:
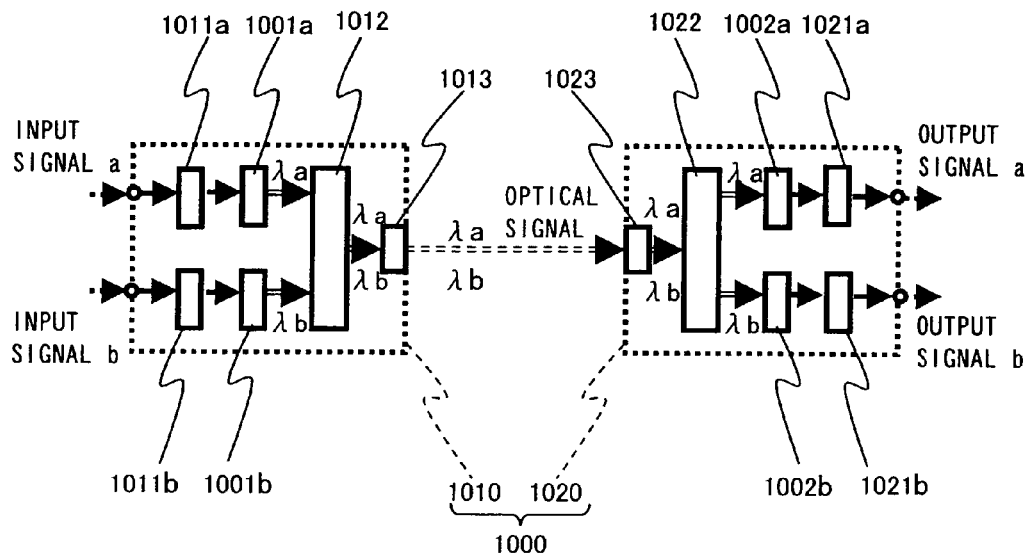
FIG. 1 is a block diagram showing a configuration of a wavelength multiplexing optical space transmission system using a wavelength multiplexing optical space transmitter of the present invention.

101*a* to *h*, 201*a* to *c*, 501*a* to *b*, 601*a* to *b*, 801*a* to *b*, 1001*a* to *b* light source
102*a* to *b*, 202*a*, to *c*, 802*a* to *b* light emitting element
103*a* to *b*, 203*a* to *c*, 803*a* to *b* light source lens
104, 204 diffusion plate
105, 205 radiation lens
106 206 axis perpendicular to surface of diffusion plate 107, 207 incident light
607 far-field pattern
607a major axis of far-field pattern
607b minor axis of far-field pattern
902 light emitting element array
903 lens array

DETAILED DESCRIPTION OF THE INVENTION

Hereinafter, an Embodiment of the present invention is described with reference to the diagrams.

Embodiment 1

FIG. 1 is a block diagram showing a configuration of a wavelength multiplexing optical space transmission system using a wavelength multiplexing optical space transmitter of the present invention.

A wavelength multiplexing optical space transmission system 1000 includes an optical transmitter 1010 and an optical receiver 1020. The optical transmitter 1010 includes: modulation circuits 1011a and 101b; light sources 1001a and 1001b; an optical multiplexing section 1012; and a transmission optical system 1013, and the optical receiver 1020 includes: a reception optical system 1023; an optical demultiplexing section 1022; light receiving sections 1002a and 1002b; and demodulation circuits 1021a and 1021b. In FIG. 1, double line arrows and double dashed line arrows represent optical signals, and single line arrows and single dashed line arrows represent electrical signals.

Next, operations of the wavelength multiplexing optical space transmission system are described. Input signals "a" and "b" of two different types are respectively inputted to the two modulation circuits 1011a and 1011b of the optical transmitter 1010, converted into electrical signals for modulating, e.g., intensity modulating, optical carriers of the light sources 1001a and 1001b, and then outputted. The outputted signals are respectively inputted to a corresponding light source of the two light sources 1001a and 1001b. The two light sources 1001a and 1001b respectively generate an optical carrier having wavelength λa and an optical carrier having wavelength λb, the wavelengths λa and λb being different from each other, modulate the generated optical carriers by using the inputted electrical signals, and output the modulated lights as optical signals. The optical signals having wavelengths different from each other are multiplexed, by the optical multiplexing section 1012, to obtain a light substantially coaxial. Thereafter, a spread angle of the obtained light is adjusted by the transmission optical system 1013 and then the adjusted light is radiated from the optical transmitter 1010 into a free space. The radiated optical signal is denoted by a double dashed line arrow in FIG. 1. The optical signal radiated into the free space is brought to the optical receiver 1020 through the reception optical system 1023. Here, the optical signal is demultiplexed into a signal of wavelength λa and a signal of wavelength λb by the optical demultiplexer 1022. Thereafter, the demultiplexed signals are converted into electrical signals by the light receiving sections 1002a and 1002b, respectively. The electrical signals are respectively inputted to the demodulation circuits 1021a and 1021b, and demodulated to obtain output signals "a" and "b" corresponding to the original input signals "a" and "b".

Figure 2:
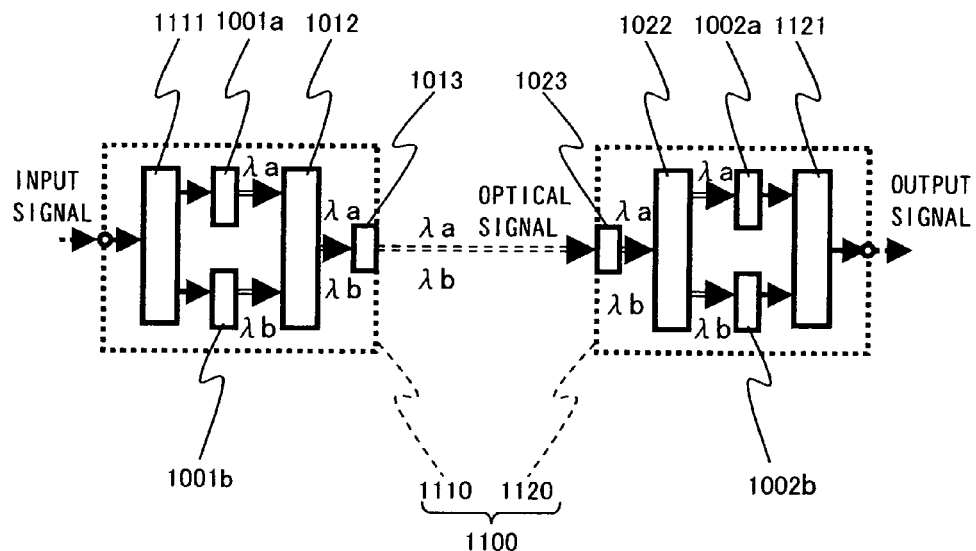
FIG. 2 is a block diagram showing a configuration of another example of the wavelength multiplexing optical space transmission system using the wavelength multiplexing optical space transmitter of the present invention.

Note that, as shown in FIG. 2, the number of input signals and output signals used may not be in plural. In an example shown in FIG. 2, a single input signal is separated into two signals using a serial/parallel conversion or the like by a modulation circuit 1111, and the separated signals are converted into electrical signals for modulating optical carriers of the light sources 1001a and 1001b, respectively. Also, each of two signals outputted from the light receiving sections 1002a and 1002b is demodulated by a demodulation circuit 1121, and a single output signal corresponding to the original input signal is obtained by using the parallel/serial conversion or the like.

As described above, a plurality of different signals can be simultaneously transmitted, and a high speed and large capacity transmission is enabled.

Figure 3:
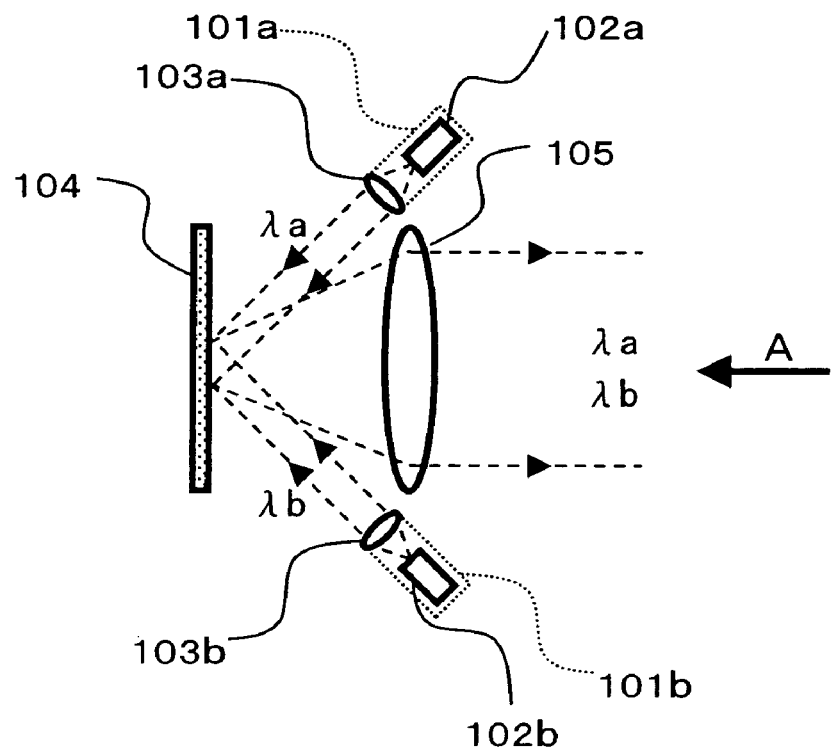
FIG. 3 is a side view showing a configuration of a wavelength multiplexing optical space transmitter according to Embodiment 1 of the present invention.

FIG. 3 is a side view showing a configuration of the wavelength multiplexing optical space transmitter, of the present invention, used in the wavelength multiplexing optical space transmission system described with reference to FIG. 1.

In FIG. 3, light sources 101a and 101b respectively include light emitting elements 102a and 102b and light source lenses 103a and 103b. The light emitting elements 102a and 102b output a signal light having wavelength λa and a signal light having wavelength λb, respectively, the wavelengths λa and λb being different from each other. The light source lens 103a is arranged such that an axis thereof is aligned with that of the light emitting element 102 and the light source lens 103b is arranged such that an axis thereof is aligned with that of the light emitting element 102b. Optical signals outputted from the light emitting elements 102a and 102b are converted into lights, which are substantially parallel lights, by the light source lenses 103a and 103b, respectively, and the parallel lights irradiate a diffusion plate 104. The light sources 101a and 101b correspond to the light sources 1001a and 1001b in the wavelength multiplexing optical space transmission system described with reference to FIG. 1, respectively. A Type of the light sources 101a and 101b is not particularly restrictive, but, for example, a semiconductor laser device can be used therefor. The light emitting elements 102a and 102b modulate, by modulation circuits connected thereto, optical carriers based on inputted electrical signals and send out optical signals. In order to help understand the description with ease, a description for the modulation circuits is omitted and the modulation circuits are not shown in FIG. 3. In a direction to which optical signals from the light sources 101a and 101b are outputted, the diffusion plate 104 of a reflective type is provided, and the light sources 101a and 101b are arranged so as to irradiate a substantially identical portion of the diffusion plate 104. The diffusion plate 104 corresponds to the optical multiplexing section 1012 in the wavelength multiplexing optical space transmission system described with reference to FIG. 1. A light which is diffuse-reflected and outputted by the diffusion plate 104, i.e., a diffuse light, is converted by a radiation lens 105 such that a spread angle thereof becomes an angle suitable for transmission in a free space and then passed out to the free space. The radiation lens 105 corresponds to the transmission optical system 1013 in the wavelength multiplexing optical space transmission system described with reference to FIG. 1. When, for example, a transmission distance is long, the spread angle of the diffuse light to be passed out to the free space is set to be narrow, so that the diffuse light is converted into a light for which a degree of parallelization is high. Such a setting is possible when the diffusion plate 104 is arranged in a vicinity of a focal point of the radiation lens 105. On the other hand, when a transmission is to be performed for a wide area, the diffuse light is converted into a light having a wide spread angle. As described above, in accordance with a purpose, setting a spread angle of light can be performed after conversion. The optical signal passed out to the free space is received by an optical receiver (the optical receiver 1020 in FIG. 1) facing thereto. The received optical signal is converted into electrical signals and then demodulated.

Next, operations in Embodiment 1 are described.

Figure 4:
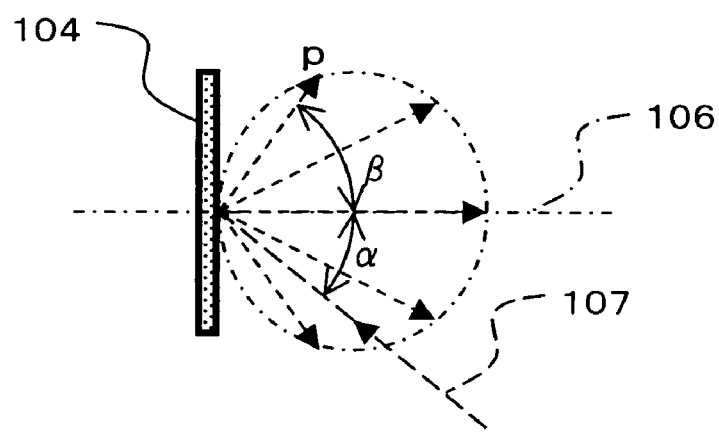
FIG. 4 is a diagram illustrating characteristics of a diffusion plate used in Embodiment 1 of the present invention.

FIG. 4 is a diagram illustrating characteristics of the reflective type diffusion plate 104 used in the optical transmitter of Embodiment 1. The reflective type diffusion plate 104 reflects entered light in a diffused manner. In FIG. 4, an incident light 107 enters with an incident angle a with respect to an axis 106 perpendicular to a surface of the diffusion plate 104, and the incident light is diffused by the surface of the diffusion plate 104. As a result, the diffuse light is radiated from the surface of the diffusion plate 104, the diffuse light having an intensity p different according to an angle β (representing an output angle) with respect to the axis 106 perpendicular to the surface of the diffusion plate 104. In FIG. 4, the radiant intensity p is represented by the length of an arrow. Ideally, a distribution of an intensity p for a diffuse light from the diffusion plate 104 is a Lambertian distribution, namely:

$$p \propto (\cos \beta)^n \quad \text{(Expression 1)}$$

Figure 5:
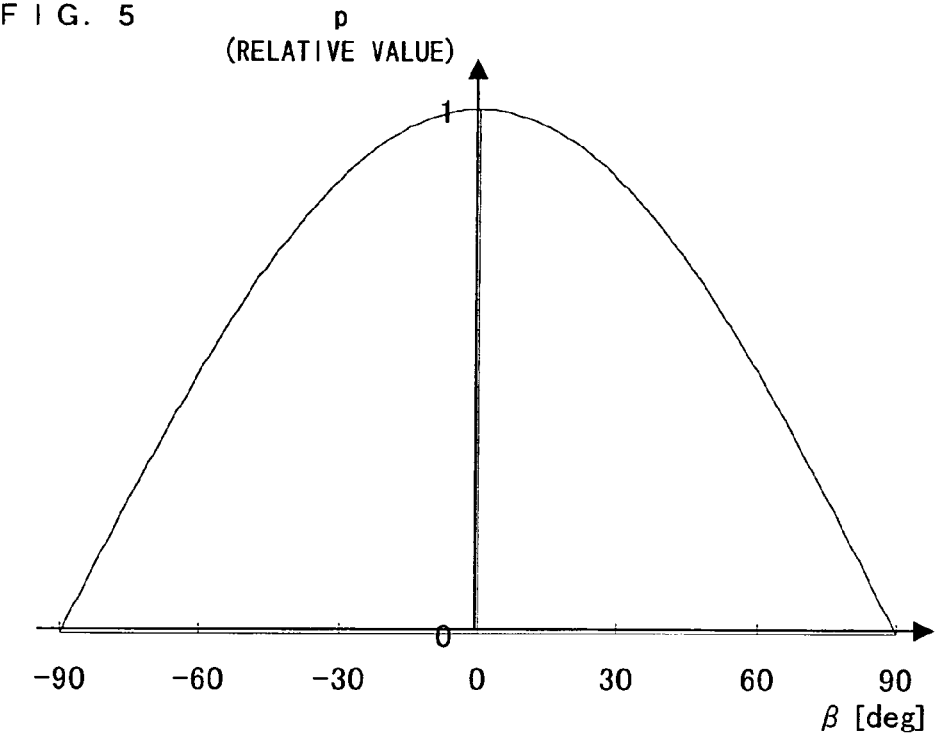
FIG. 5 is a graph showing characteristics of the diffusion plate used in Embodiment 1 of the present invention.

The "n" therein takes a different value according to material characteristics of the diffusion plate 104 but generally, close to one. In FIG. 4, the circle represented with a dashed-dotted line shows a distribution of the radiant intensity p when n=1 in Expression 1. FIG. 5 is a graph obtained when the distribution of the radiant intensity p is represented in a graph whose horizontal axis is angle β. The vertical axis of FIG. 5 represents a relative value for a radiant intensity p with respect to each β, in the case where a radiant intensity is one at β=0°. The radiant intensity is maximum when β=0°, the further away from zero the β is, the smaller the radiant intensity is, and the intensity becomes zero when β=±90°.

The above-described characteristics are realized when, for example, a minute granular material is mixed in a resin material or a minute foam structure is used for the resin material, or alternatively, a paint added with a material such as barium is applied to a plate material. In Embodiment 1, a plurality of light sources 101a and 101b for outputting signal lights having wavelengths λa and λb different from each other are arranged such that the signal lights therefrom irradiate an approximately identical portion on the reflective type diffusion plate 104 having the above-described characteristics (see FIG. 3). Accordingly, at the irradiated portion of the diffusion plate 104, the light having the wavelength λa and the light having the wavelength λb together are reflected with an intensity distribution proportional to cos β to the power of n (see Expression 1). In other words, optical signals respectively having wavelengths λa and λb different from each other enter the reflective type diffusion plate 104 from different directions, and the wavelengths λa and λb different from each other are multiplexed, by the reflective type diffusion plate 104, to obtain an optical signal whose optical axes therein are aligned with respect to each corresponding or coincided optical intensity for output. For example, according to Expression 1, light with a reflection angle 0° has a maximum intensity regardless of the incident angle thereof. Accordingly, at a reflection angle (β=0°, lights of maximum intensities for lights having the wavelengths λa and λb different from each other are multiplexed, so that a wavelength-multiplexed light of a maximum intensity for which optical axes therein are aligned can be outputted. Then, an adjustment is performed by the radiation lens 105 for a spread angle of the wavelength-multiplexed optical signal for which wavelengths λa and λb are multiplexed, and the adjusted optical signal is outputted to the free space. The radiation lens 105 is a useful member especially when a light other than a light having a reflection angle β close to 0° is used. Through using the radiation lens 105, a light having a small spread angle can be obtained. When a light having a small spread angle is used, light energy received by an optical receiver (described later) can be increased and speed of information transmission can be enhanced while a SN ratio (signal-to-noise ratio) is maintained. Also, receivability of light in the optical receiver can be enhanced. The enhancement of the receivability of light leads to expansion of the effective transmission distance for an optical signal.

As described, after being diffuse-reflected by the diffusion plate 104, both of the optical signals respectively having the wavelengths λa and λb have a large intensity in the vicinity of a direction perpendicular to the diffusion plate 104. Accordingly, by outputting a diffuse light in the vicinity of the perpendicular direction through the radiation lens 105 to the free space, it is possible to perform an optical signal transmission efficient for both of the optical signals respectively having the wavelengths λa and λb. For example, when n=1 in Expression 1 and a lens having a numerical aperture NA=0.85 is used, a communication light having an optical power equal to or greater than 40% of that of the diffuse light can be outputted to the free space. The multiplexed optical signal is demultiplexed by the optical receiver facing thereto to obtain optical signals respectively having the wavelengths λa and λb by using a known appropriate method such as using of an optical filter. The demultiplexed optical signals are respectively converted into electrical signals and the electrical signals are demodulated. As such, a wavelength multiplexing transmission can be performed. Also, the plurality of light sources 101a and 101b may only irradiate an approximately identical portion on the diffusion plate 104, and incident angles of lights therefrom do not cause an influence. Consequently, it is also possible to obtain an effect that optical axis adjustment for the light sources 101a and 101b becomes easy.

Also, even when the light emitting elements 102a and 102b are light sources, e.g., a semiconductor laser, having high coherence, directivity, focusability, and energy density, the coherence, directivity, focusability, and energy density are reduced due to the diffuse-reflection by the diffusion plate 104, causing the light sources to be secondary, and lights therefrom are outputted from the radiation lens 105 to the free space. Accordingly, even when the eyes are accidentally exposed to the light outputted to the free space or the outputted light is mistakenly observed through binoculars, risk of injury to the eyes is reduced. In other words, safety for light outputted to the free space can be enhanced.

Accordingly, by having a configuration in which the light sources 101a and 101b are so arranged that lights of different wavelengths irradiate an approximately identical portion of the diffusion plate 104 and a diffuse light from the diffusion plate 104 is so converted by the radiation lens 105 that the angle thereof is appropriate for transmission in a free space, it is possible to obtain the following effects. With the simple configuration using the single diffusion plate 104 and without requiring a highly precise angle adjustment for optical axes, it is possible to realize a transmitter for wavelength multiplexing optical space transmission in which a plurality of optical signals having different wavelengths are multiplexed based on a coincided optical axis to obtain a wavelength-multiplexed signal light, and risk of eye injury is simultaneously reduced. Also, efficient optical signal transmission is enabled by using light included in the vicinity of a direction perpendicular to the diffusion plate 104. Note that the radiation lens 105 is useful in directing a large portion of a diffuse light to a single direction, i.e., in aligning traveling directions of light, but not necessarily required in the present embodiment. For example, when a diffuse light having a small range of an output angle β (see FIG. 4), i.e., a diffuse light included in a direction approximately perpendicular to the diffusion plate 104, is used for optical transmission, the radiation lens 105 may not be used.

Figure 6:
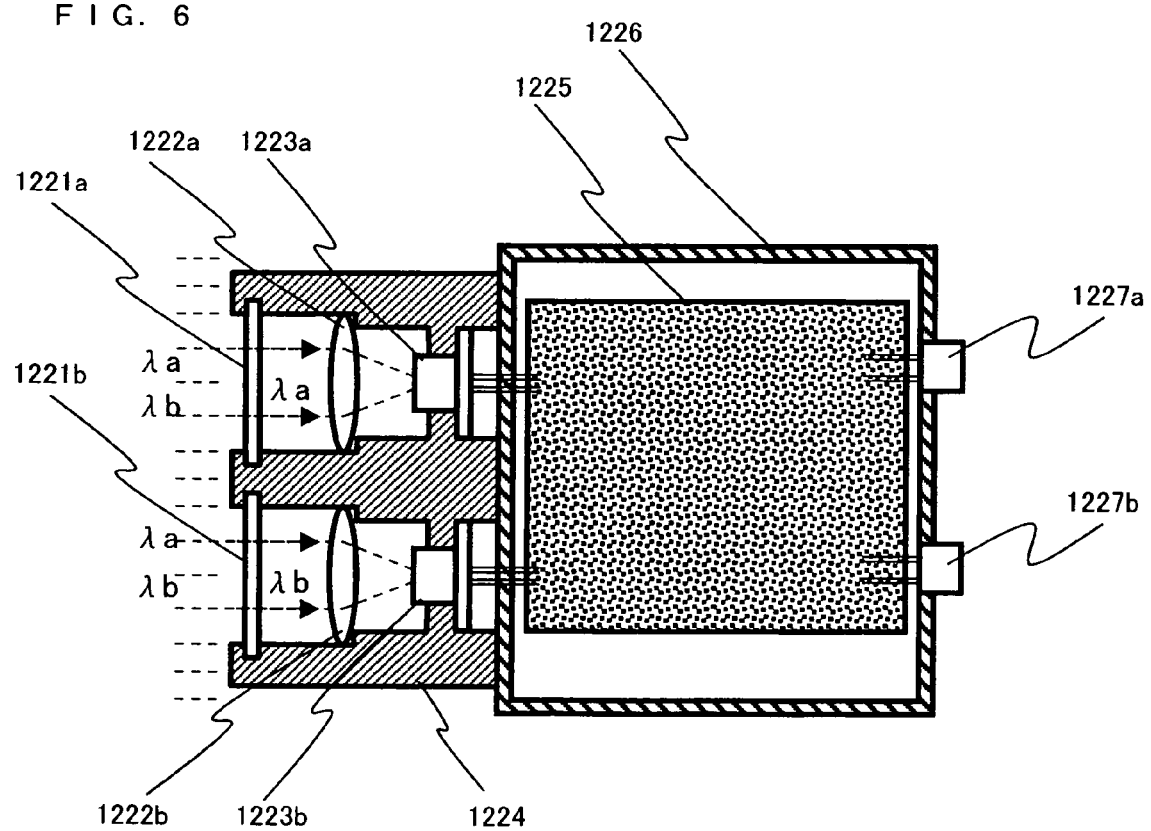
FIG. 6 is a side view showing a configuration of a wavelength multiplexing optical space receiver for receiving optical signals sent from the wavelength multiplexing optical space transmitter of the present invention.

FIG. 6 is a cross-sectional view showing the side of an exemplary configuration of an optical receiver. In FIG. 6, optical filters 1221a and 1222b, light-receiving lenses 1222a and 1222b, and light-receiving elements 1223a and 1223b are fixed in an optical system housing 1224. A demodulation circuit board 1225 and output terminals 1227a and 1227b are fixed to a circuit case 1226. The optical housing 1224 and the circuit case 1226 are connected to each other, and the light-receiving elements 1223a and 1223b are connected to the demodulation circuit board 1225.

The optical filter 1221a has characteristics that light of λa is allowed to pass through and light of λb is not allowed to pass through, and the optical filter 1221b has characteristics that light of λb is allowed to pass through and light of λa is not allowed to pass through. Accordingly, the light-receiving lens 1222a only receives signal light of λa and the light-receiving lens 1222b only receives signal light of λb. These signal lights are collected by the light-receiving lenses 1222a and 1222b and directed onto the light-receiving elements 1223a and 1223b. The optical filters 1221a and 1222b correspond to the optical demultiplexer 1022 of FIG. 1, the light-receiving lenses 1222a and 1222b correspond to the reception optical system 1023 of FIG. 1, and the light-receiving elements 1223a and 1223b correspond to the light receiving sections 1002a and 1002b of FIG. 1. With these, a wavelength-multiplexed signal is split into two optical signals: an optical signal having wavelength λa; and an optical signal having wavelength λb. The split optical signals are respectively converted into electrical signals and inputted to the demodulation circuit board 1225. In the demodulation circuit board 1225, amplification, level adjustment, demodulation process, and the like are performed, and a signal corresponding to the signal inputted to the optical transmitter is outputted.

Figure 7:
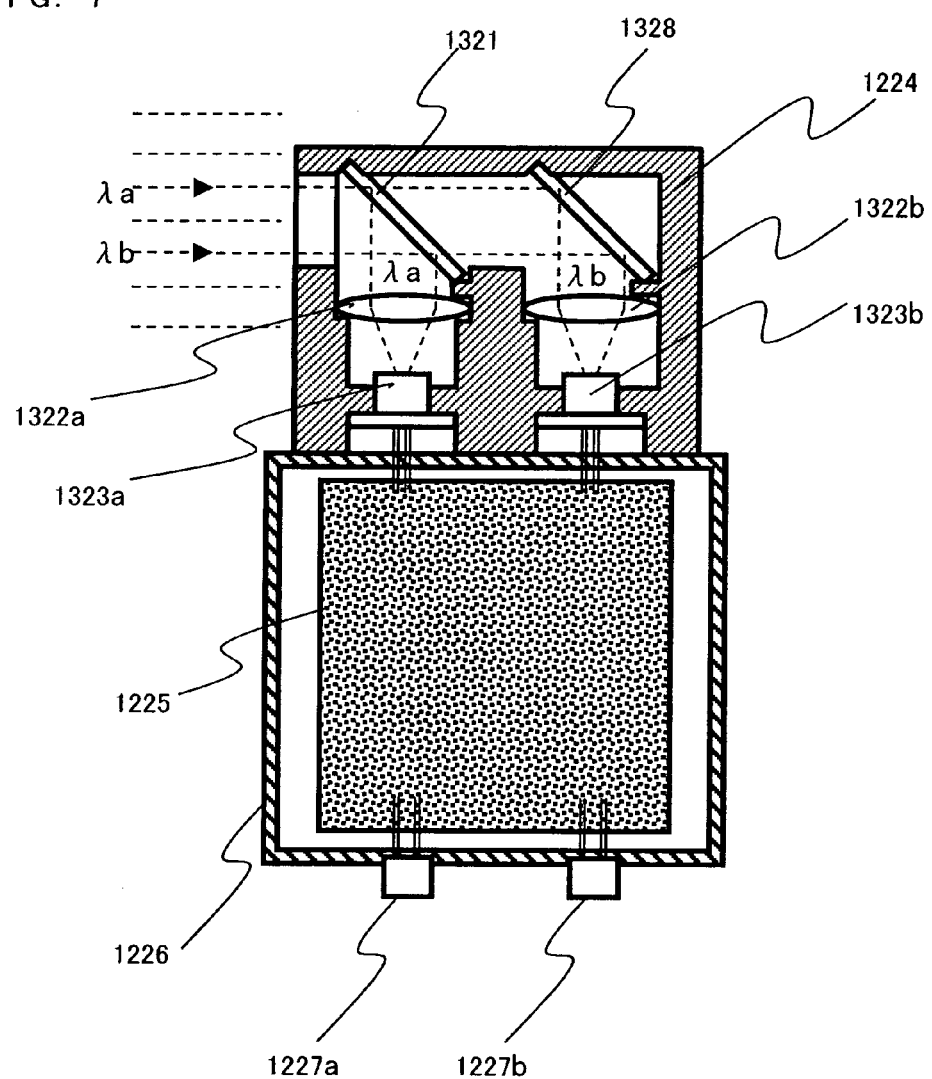
FIG. 7 is a side view showing a configuration of another example of the wavelength multiplexing optical space receiver for receiving optical signals sent from the wavelength multiplexing optical space transmitter of the present invention.

Note that the optical receiver can be configured as shown in FIG. 7. The optical receiver shown in FIG. 7 is different from the optical receiver shown in FIG. 6 in the following point: a dichroic mirror 1321 has characteristics that light of λb is allowed to pass through and light of λa is reflected. The light of λa is reflected by the dichroic mirror 1321, collected by a lens 1322a, and directed onto a light-receiving element 1323a. The light of λb is passed through the dichroic mirror 1321, reflected by a mirror 1328, collected by a lens 1322b, and directed onto a light-receiving element 1323b. Other constituents are configured in a similar manner to the case of FIG. 6, and therefore, same reference numerals used in FIG. 6 are assigned and a description therefor is omitted.

Embodiment 2

Figure 8:
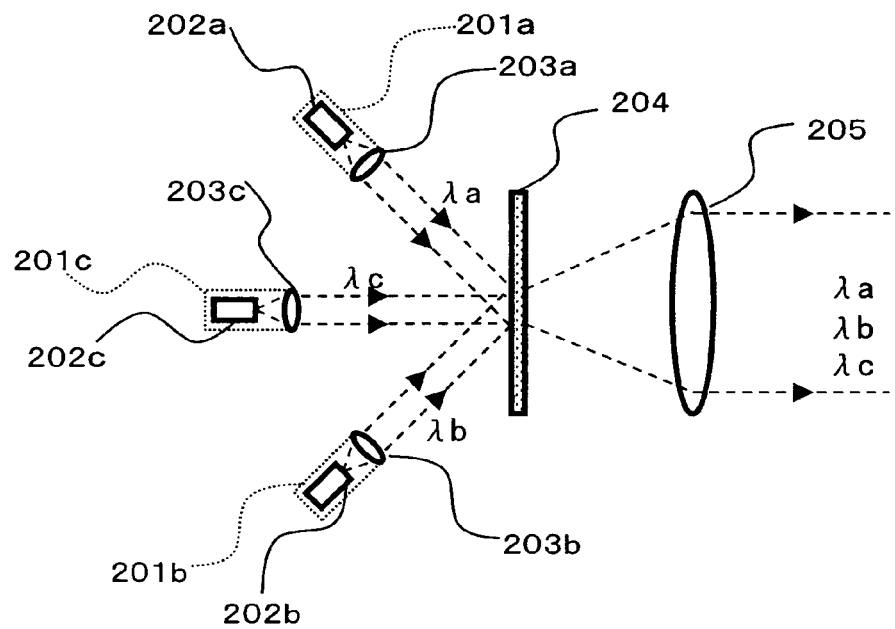
FIG. 8 is a side view showing a configuration of a wavelength multiplexing optical space transmitter according to Embodiment 2 of the present invention.

FIG. 8 is a side view showing a configuration of a wavelength multiplexing optical space transmitter according to Embodiment 2 of the present invention.

In FIG. 8, light sources 201a, 201b, and 201c respectively include light emitting elements 202a, 202b, and 202c, and light source lenses 203a, 203b, and 203c. The light emitting elements 202a, 202b, and 202c respectively output signal lights of wavelengths λa, λb, and λc different from each other. The light source lenses 203a, 203b, and 203c are arranged such that the axes thereof are approximately aligned with those of the corresponding light emitting elements 202a, 202b, and 202c. Optical signals outputted from the light emitting elements 202a, 202b, and 202c are converted, by the light source lenses 203a, 203b, and 203c, respectively, into substantially parallel lights, and the parallel lights irradiate a diffusion plate 204. The light emitting elements 202a, 202b, and 202c modulate, by modulation circuits connected thereto, optical carriers based on inputted electrical signals, and send out optical signals. Note that, in order to help understand the description with ease, a description for the modulation circuits are omitted and FIG. 8 does not show the modulation circuits. The diffusion plate 204 of a transmissive type is provided in a direction to which the light sources 201a, 201b, and 201c output optical signals. Characteristics of the transmissive type diffusion plate 204 are described later. The light sources 201a, 201b, and 201c are arranged so as to irradiate an approximately identical portion of the diffusion plate 204, and the optical signals therefrom are diffuse-transmitted by the diffusion plate 204. The diffuse light thereby outputted from the diffusion plate 204 is converted, by a radiation lens 205, into a light whose spread angle is adjusted to be an angle appropriate for transmission in a free space, e.g., a light whose degree of parallelization is high, and sent out to the free space. The optical signal sent out to the free space is received by an optical receiver facing thereto (the optical receiver 1020 in FIG. 1), converted into an electrical signal, and then demodulated.

When compared to Embodiment 1, Embodiment 2 is different in that: the transmissive type diffusion plate 204 is used; and lights outputted from the light sources 201a, 201b, and 201c are passed through the transmissive type diffusion plate 204 and outputted from a surface, of the diffusion plate 204, opposite to the side of entrance of the lights.

Next, operations in Embodiment 2 are described.

Figure 9:
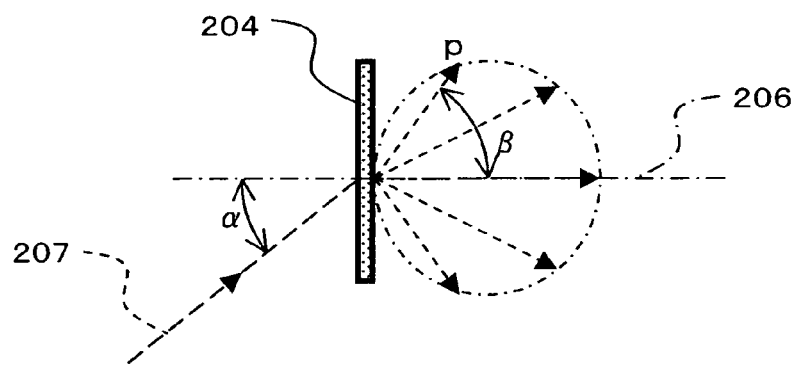
FIG. 9 is a diagram illustrating characteristics of a diffusion plate used in Embodiment 2 of the present invention.

FIG. 9 is a diagram illustrating characteristics of the transmissive type diffusion plate 204 used in the optical transmitter of Embodiment 2. A light 207 enters with an incident angle a with respect to an axis 206 perpendicular to a surface of the diffusion plate 204. The transmissive type diffusion plate 204 is similar to the reflective type diffusion plate 104 in that an entered light is diffused, but different from the diffusion plate 104 in that the diffused light is passed through for output. When an angle between the axis 206 perpendicular to the surface of the diffusion plate 204 and an output direction of a diffuse light is β, an intensity distribution p for the light passed therethrough is ideally the aforementioned Lambertian distribution of Expression 1 regardless of an incident angle a. The circle represented with a dashed-dotted line in FIG. 9 shows a distribution of a radiant intensity p when n=1 in Expression 1. FIG. 5 is a graph obtained when the distribution of the radiant intensity p is represented in a graph whose horizontal axis is angle β. The above-described characteristics are realized when, for example, minute granular transparent materials having different reflective indices are mixed in a transparent resin material or a transparent resin material having a minute foam structure is used. In Embodiment 2, a plurality of light sources 201a, 201b, and 201c are arranged so as to irradiate an approximately identical portion of the transmissive type diffusion plate 204 having the above-described characteristics. The light sources 201a, 201b, and 201c respectively output signal lights respectively having wavelengths λa, λb, and λc different from each other. Embodiment 2 and Embodiment 1 are different in that an incident light is either reflected or transmitted when diffused. However, Embodiment 2 is similar to Embodiment 1 in that optical signals respectively having wavelengths λa, λb, and λc different from each other are multiplexed based on a coincided optical axis to obtain an optical signal, and in that, simultaneously, even if the light sources 201a, 201b, and 201c are light sources, e.g., a semiconductor laser, having high coherence, directivity, focusability, and energy density, lights therefrom are diffused by the diffusion plate 204, and therefore, risk of injury to the eyes can be reduced, enhancing safety.

As described above, in Embodiment 2, the light sources 201a, 201b, and 201c are arranged so as to irradiate an approximately identical portion of the diffusion plate 204, the diffuse light generated by the diffusion plate 204 is converted, by the radiation lens 205, so that angle thereof is appropriate for transmission in a free space, and subsequently, the converted diffuse light is sent out to the free space. Accordingly, with a simple configuration using the single diffusion plate 204 and without requiring a highly precise angle adjustment for optical axes, it is possible to realize a transmitter, for wavelength-multiplexing optical space transmission, in which optical signals having different wavelengths are multiplexed based on a coincided optical axis to obtain a wavelength-multiplexed signal light, and, without separately providing an optical system for enhancing safety, risk of eye injury is simultaneously reduced. Also, an efficient optical signal transmission is possible by using light included in a direction perpendicular to a surface of the diffusion plate 204. Note that, the radiation lens 205 is useful in directing a large portion of a diffuse light to a single direction, i.e., in aligning travel directions of light, but not necessarily required in the present embodiment. For example, when a diffuse light having a small range of an output angle β (see FIG. 9), i.e., a diffuse light included in a direction approximately perpendicular to the diffusion plate 204, is used for optical transmission, it is possible to dispense with the radiation lens 205.

In Embodiments 1, two light sources 101a and 101b are shown as examples, and, in Embodiment 2, three light sources 201a, 201b, and 201c are shown as examples, but the number of light sources is not limited thereto. In the case of increasing the number of light sources also, a single diffusion plate 104 or the diffusion plate 204 allows to obtain a multiplexed signal whose optical axes therein are aligned by irradiating, with optical signals from the light sources, an approximately identical portion thereof. When considering the aforementioned conventional example where the number of dichroic mirrors has to be increased as the number of light sources (the number of wavelengths) is increased, the present invention having a simple configuration has an effect becoming more remarkable as the number of light sources increases.

Figure 10:
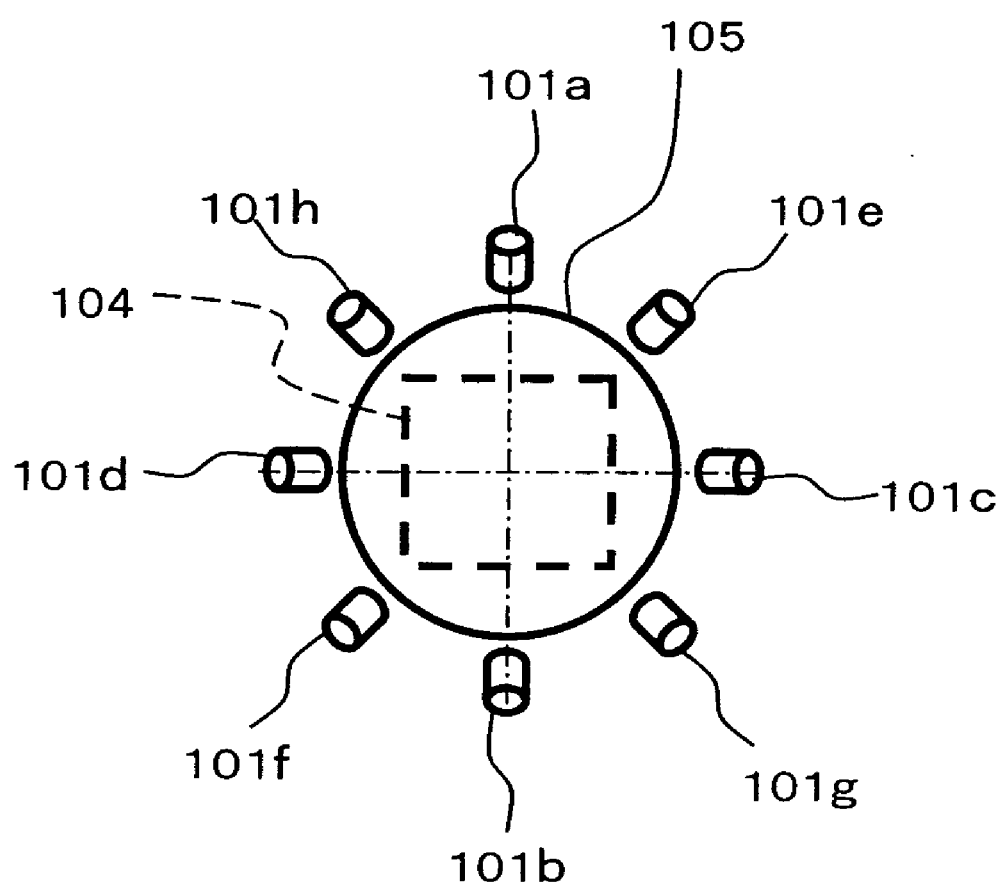
FIG. 10 shows a front view of a configuration of a first example of the wavelength multiplexing optical space transmitter according to Embodiment 1 of the present invention.

When the number of light sources is increased, the light sources are to be arranged in circle, allowing an easy arrangement for the light sources. For example, in Embodiment 1, circular arrangement may be performed in the vicinity of the radiation lens 105. FIG. 10 is a front view of FIG. 3 viewed from a direction "A" and shows a configuration example when the number of light sources is eight in Embodiment 1. In this example, in addition to the two light sources 101a and 101b for outputting optical signals having different wavelengths, six light sources 101c to 101h for outputting optical signals having different wavelengths are arranged in circle. By arranging the light sources as above, a plurality of optical signals from the eight light sources can be multiplexed without having a large volume in the optical transmitter.

Figure 11:
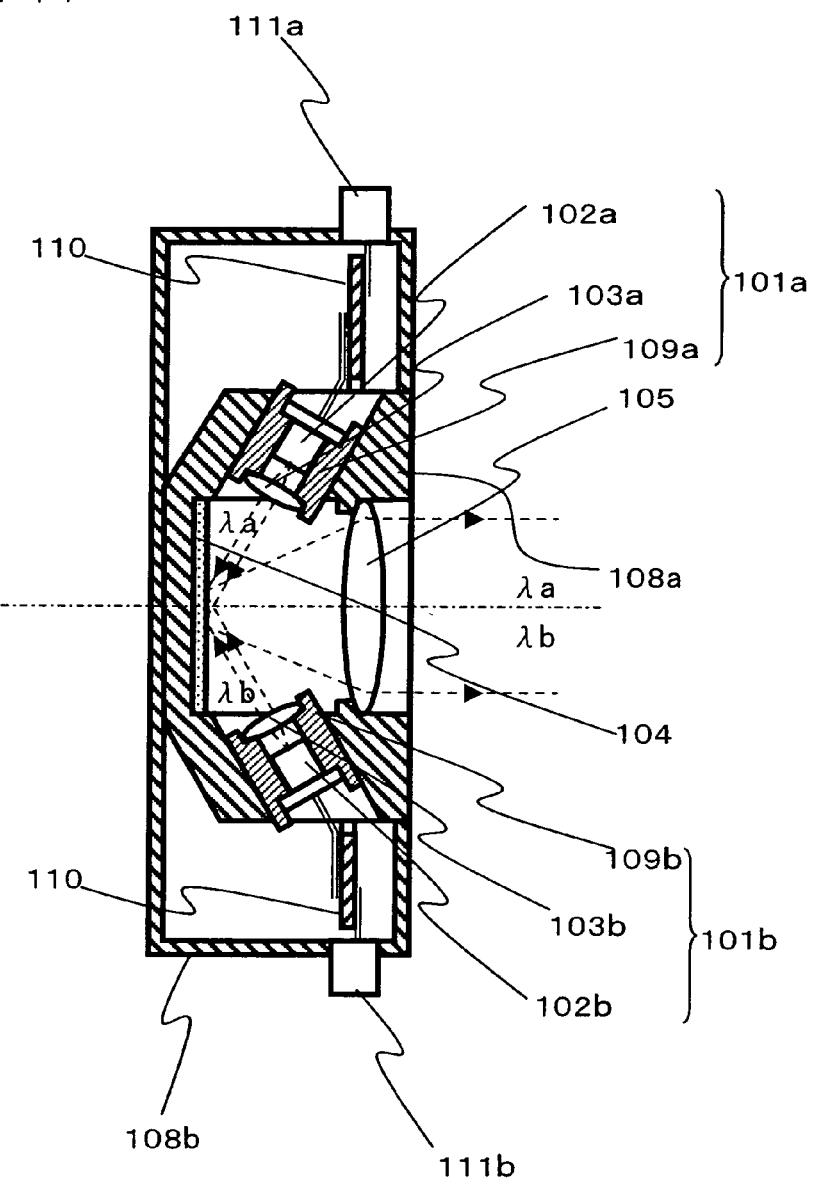
FIG. 11 shows a cross sectional view of a configuration of a second example of the wavelength multiplexing optical space transmitter according to Embodiment 1 of the present invention.

Also, in Embodiments 1 and 2, constituent parts are fixed to a housing so as to be modularized, allowing an easy handling and constructing thereof. FIG. 11 shows a cross sectional view of a configuration of FIG. 3 (Embodiment 1) including the housing, circuit boards, and input terminals. The light emitting elements 102a and 102b and the light source lenses 103a and 103b are respectively fixed to an interior of light source housings 109a and 109b. Through respectively arranging light emitting sections of the light emitting elements 102a and 102b in the vicinity of focal points of the lenses 103a and 103b, output lights become parallel lights. To an optical system section 108a of a housing 108, the diffusion plate 104 and the radiation lens 105 are fixed and the light source housings 109a and 109b are inserted and fixed. To a circuit section 108b of the housing, modulation circuit boards 110 (corresponding to 1011a and 1011b in FIG. 1) and input terminals 111a and 111b are fixed.

Figure 12:
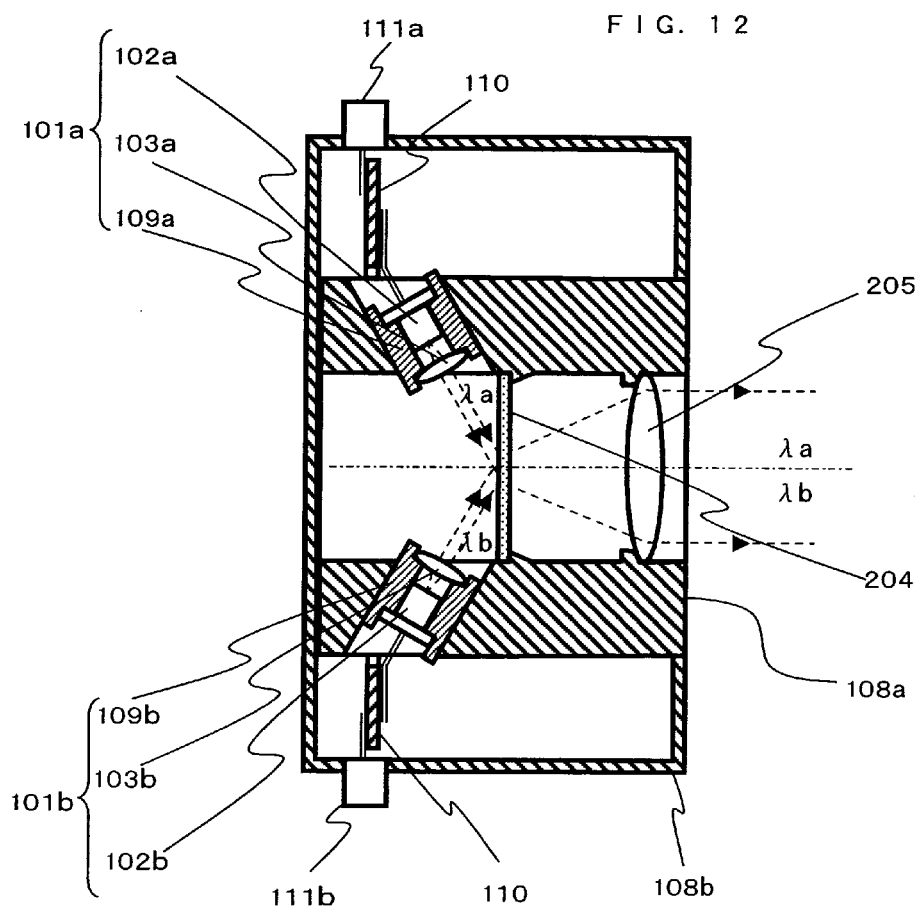
FIG. 12 shows a cross sectional view of a configuration of the first example the wavelength multiplexing optical space transmitter according to Embodiment 2 of the present invention.

FIG. 12 shows a cross sectional view of a configuration of FIG. 8 (Embodiment 2) including a housing, circuit boards, and input terminals. FIG. 12 is different from FIG. 11 only in that either incorporation performed for the housing is applied to Embodiment 2 or to Embodiment 1, and therefore a description therefor is omitted. Note that members having functions same as those of members of FIG. 11 are assigned same reference numerals.

Figure 13:
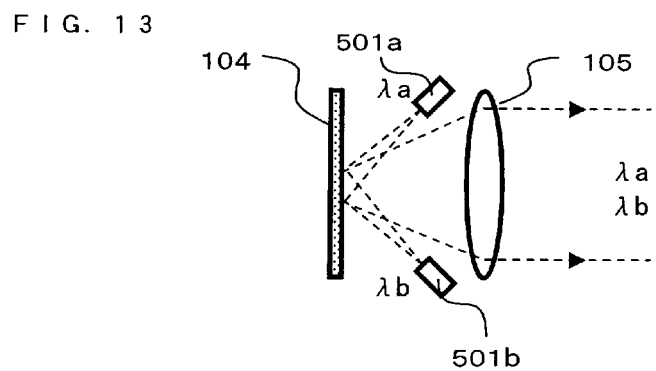
FIG. 13 shows a side view of a configuration of a third example of the wavelength multiplexing optical space transmitter according to Embodiment 1 of the present invention.

In Embodiment 1, the light sources 101a and 101b irradiate the diffusion plate 104 with parallel lights which are lights, from the light emitting elements 102a and 102b, having been made to substantially parallel lights by the light source lenses 103a and 103b. In Embodiment 2, the light sources 201a, 201b, and 201c irradiate the diffusion plate 204 with parallel lights which are lights, from the light emitting elements 202a, 202b, and 202c, having been made to substantially parallel lights by the light source lenses 203a, 203b, and 203c. However, a light used to irradiate from the light source to the diffusion plate is not necessarily be a parallel light. For example, in FIG. 13, light sources 501a and 501b for outputting spread lights are provided instead of the light sources 101a and 101b of FIG. 3, and the spread lights as shown in FIG. 13 may be outputted, if spread angles of signal lights outputted from the light sources 501a and 501b are appropriate. Also, depending on an output spread angle for a light emitting element, a light source lens may be unnecessary. Also, a light source for outputting a convergent light such as a laser beam may of course be used.

Figure 14:
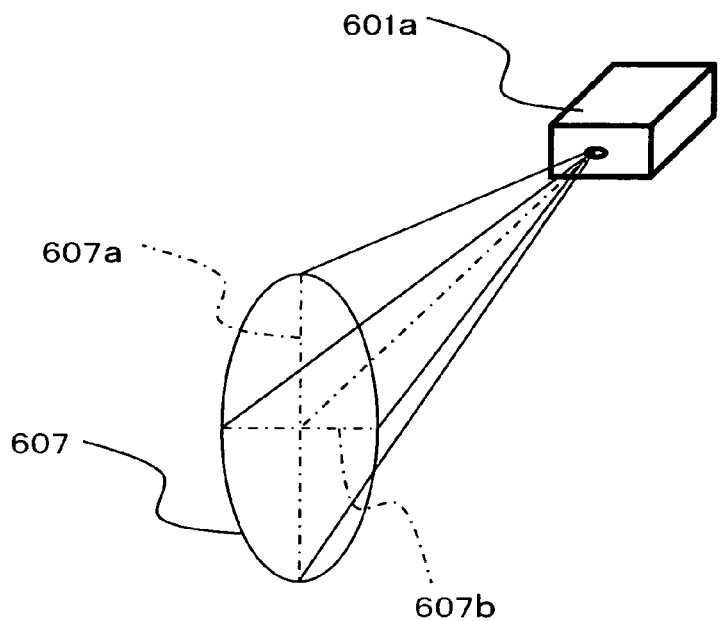
FIG. 14 shows a schematic diagrammatic perspective view of a light source having a far-field pattern of elliptic shape.
Figure 15:
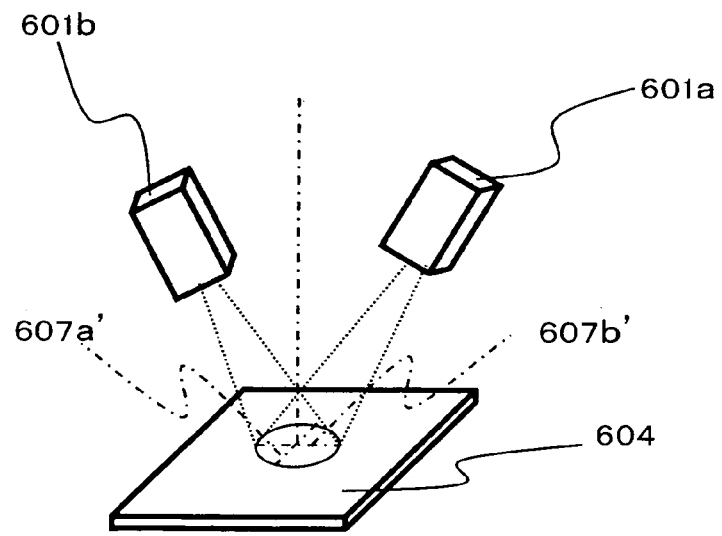
FIG. 15 is a schematic diagrammatic perspective view showing an example in arranging light sources used in Embodiments 1 and 2 of the present invention.

In some cases, an output light from a light source has a far-field pattern of an ellipse shape. For example, in an edge emitting semiconductor laser device, light whose far-field pattern being an ellipse shape as shown in FIG. 14 is outputted. The ellipse has a major axis 607a and a minor axis 607b. Also, even when light from such a light emitting element is outputted via a lens, generally, light of an ellipse shape is outputted. In the case of using a light source 601a having a far-field pattern of an ellipse shape, the light source 601a may be tilted in a direction of the minor axis 607a for arrangement. FIG. 15 shows a schematic diagrammatic perspective view of a configuration in arranging light sources having a far-field pattern of an ellipse shape. The light source 601a is arranged so as to be tilted in a direction of the minor axis 607b of the far-field pattern of an output light, whereby a difference, in length, between an axis 607b' of a minor axis and an axis 607a' of a major axis for a pattern of the output light can be minimized on a diffusion plate 604. As a result, on the diffusion plate 604, an irradiation pattern close to a circle can be obtained. When another light source 601b having a different wavelength is similarly arranged, irradiation patterns thereof become easily adjustable, and multiplexed signal lights to be outputted to a free space can also have irradiation patterns similar to each other among different wavelengths.

Note that, in Embodiments 1 and 2, it is conceivable to have a case in which the diffusion plate 104 or 204 does not have ideal diffusion characteristics as shown in FIG. 4 or 9, but has characteristics of a specular reflection plate in part. In such a case, when a positional relationship of the light source 101a and the light source 101b is symmetrical with respect to an axis perpendicular to a surface of the diffusion plate 104 in FIG. 3 for example, a reflecting light obtained by reflecting light from the light source 101a by the diffusion plate 104 enters the light emitting element 102b and a reflecting light obtained by reflecting light from the light source 101b by the diffusion plate 104 enters the light emitting element 102a. Accordingly, an interference between the output light and the incident light occurs in the light emitting elements 102a and 102b, causing a problem of noise increase. In view of the above, the light source 101a and the light source 101b may be arranged such that positions thereof have a relationship other than a positional relationship where a specular reflection with respect to the surface of the diffusion plate 104 occurs, namely, other than a symmetrical positional relationship with respect to an axis passing through a portion irradiated with light and perpendicular to the surface of the diffusion plate 104. As such, noise increase in the light emitting elements 102a and 102b due to reflecting lights can be prevented.

Alternatively, instead of the light source 101a and the light source 101b being arranged to positions having a relationship other than a positional relationship where a specular reflection with respect to the surface of the diffusion plate 104 occurs, the light source 101a and the light source 101b may be arranged such that a polarization plane of an output light of the light source 101a and a polarization plane of an output light of the light source 101b are orthogonal to each other. As a result, even when a reflecting light enters the light emitting element 102a or 102b which is positioned symmetrical to the other, an optical coupling (interference) between the reflecting light and an output light of the light emitting element 102a or 102b does not occur, whereby noise increase in the light emitting elements 102a and 102b can be prevented.

Figure 16:
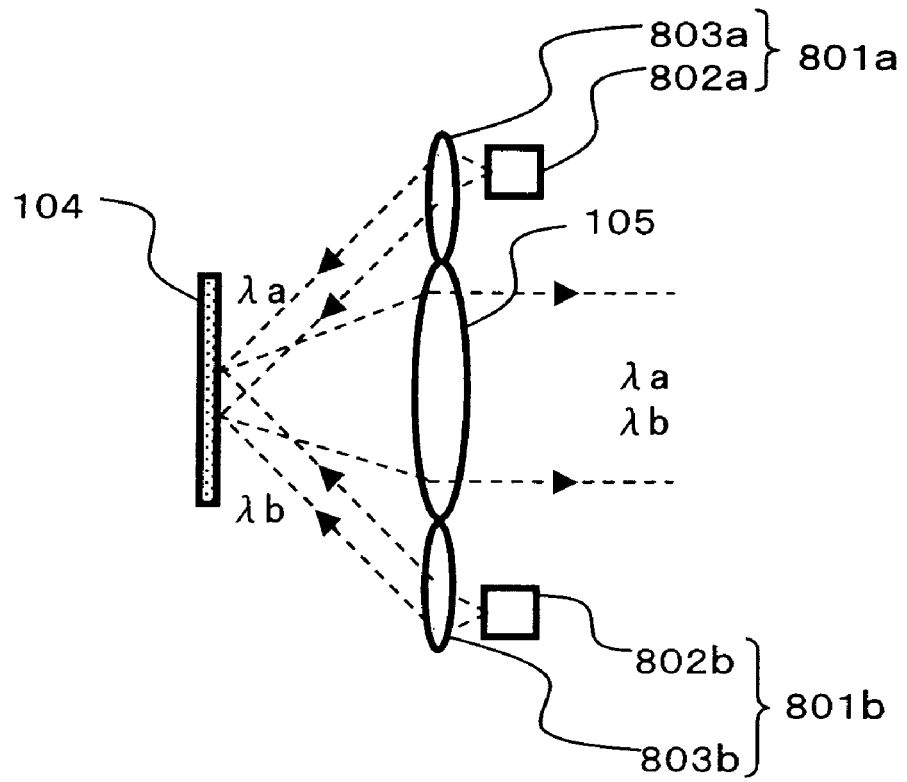
FIG. 16 shows a schematic diagrammatic perspective view of a configuration of a fourth example of the wavelength multiplexing optical space transmitter according to Embodiment 1 of the present invention.

In Embodiments 1 and 2, an axis of the light emitting element and an axis of the light source lens are approximately aligned, but the axes may be displaced from each other for arrangement. For example, FIG. 16 shows an exemplary configuration in which light emitting elements 802a and 802b and light source lenses 803a and 803b replace the light emitting elements 102a and 102b and the light source lenses 103a and 103b of Embodiment 1, and are so arranged that corresponding axes thereof are displaced relative to each other. Through displacing an axis of the light emitting element 802a from that of the light source lens 803a, light is outputted diagonally with respect to the axis of the light source lens 803a. With this configuration, the output light from the light source lens 803a and an output light from the light source lens 803b irradiate an approximately identical portion on the reflective type diffusion plate 104. As such, even when the axis of the light emitting element 802a is displaced from that of the light source lens 803a and the axis of the light emitting element 802b is displaced from that of the light source lens 803b in arrangement, it is possible to obtain a same effect obtained in Embodiment 1 of FIG. 3. Also, it is possible that all axes including the axes of the light emitting elements 802a and 802b, the axes of the light source lenses 803a and 803b, and an axis of the radiation lens 105 are caused to be parallel to each other, thereby allowing each of the axes to be perpendicular to the surface of the diffusion plate 104. As such, it is possible to obtain an effect that designing a structure of an entire optical transmitter is made easy.

Also, in the case of arranging a light source lens around a radiation lens, a lens for which the radiation lens and the light source lens are unified can be used. For example, in an example shown in FIG. 3, the light source lenses 103a and 103b are arranged around the radiation lens 105, but the light source lenses 101a and 101b can be arranged further closer to the radiation lens 105 because an intensity distribution of light outputted from the diffusion plate 104 is independent of incident angles of lights sent from the light sources 101a and 101b. In such a case, the radiation lens 105 and the light source lenses 103a and 103b can be formed in one piece by using a mold with, e.g., a glass material or a resin material. Accordingly, the number of members can be reduced and an optical transmitter easy to build can be realized.

In an example shown in FIG. 16 also, the radiation lens 105 and the light source lenses 803a and 803b can be similarly unified. In this example, axes of the light emitting elements 802a and 802b and corresponding axes of the light source lenses 803a and 803b are displaced relative to each other, so that the axes of the light source lenses 803a and 803b and the axis of the radiation lens 105 can be parallel to each other. Through causing the axes to be parallel, when lenses are formed in one piece using the mold, it is possible to obtain effects that mold making becomes easy and a quality of a molded lens is easily maintainable.

Figure 17:
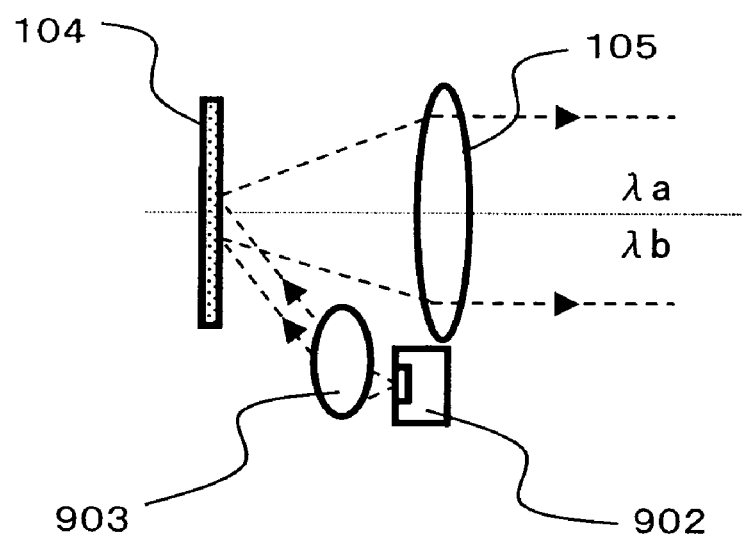
FIG. 17 shows a plan view of a configuration of a fifth example of the wavelength multiplexing optical space transmitter according to Embodiment 1 of the present invention.
Figure 1:
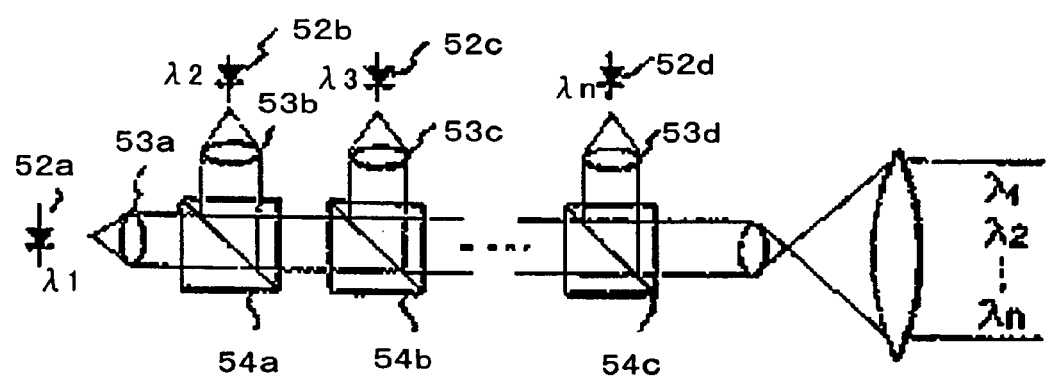
Figure 20:
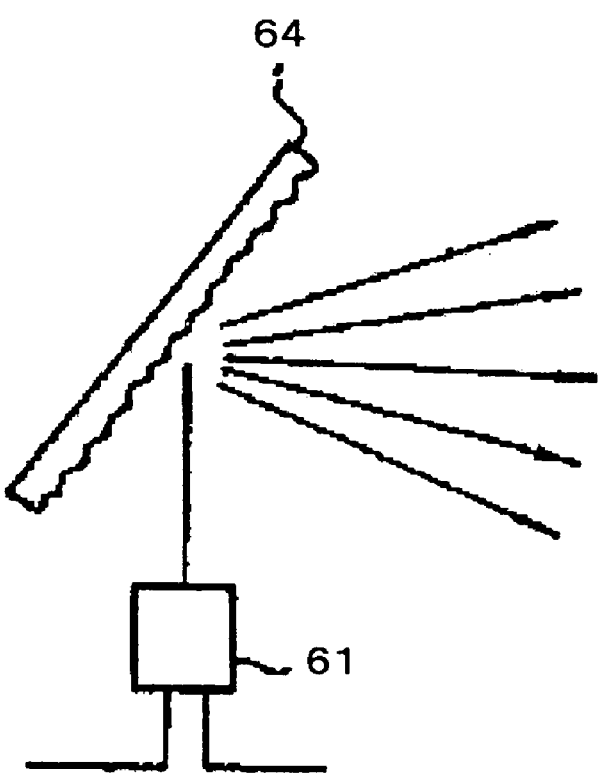
FIG. 20 is a configuration diagram of a conventional wavelength multiplexing optical space transmitter.

In Embodiments 1 and 2, each of the light sources 101a, 101b and 201a to 201c includes a corresponding discrete light emitting element 102a, 102b, or 202a to 202c together with a corresponding discrete light source lens 103a, 103b, or 203a to 203c, but the light emitting elements may include a light emitting element array having a plurality of light emitting sections, or may include a unified lens. For example, FIGS. 17 and 18 are a front view and a side view of a configuration using a light emitting element array 902 and a lens array 903, respectively. When FIGS. 17 and 18 are compared to FIG. 3 representing Embodiment 1, they are similar in that the reflective type diffusion plate 104 and the radiation lens 105 are used. Differences therebetween are in that: instead of the light emitting elements 102a and 102b, the light emitting element array 902 for which light emitting sections 902a and 902b for outputting two lights of different wavelengths are arranged in an array is used; and, instead of the light source lenses 103a and 103b, a lens array 903 for which two lens sections 903a and 903b are unified is used. The light emitting sections 902a and 902b and lens sections 903a and 903b are arranged such that corresponding axes are displaced from each other, causing lights from the lens sections 903a and 903b to be outputted diagonally with respect to the corresponding axes, causing each of the output lights to irradiate an approximately identical portion of the diffusion plate 104. Through having such a configuration, it is possible to configure an optical transmitter with the number of constituent parts remarkably small.

INDUSTRIAL APPLICABILITY

With a simple configuration using a single diffusion plate, an optical space transmitter and an optical space transmission method, for wavelength-multiplexed light, according to the present invention can perform a wavelength multiplexing by multiplexing optical signals having a plurality of wavelengths different from each other, regardless of the number of frequencies. Also, the optical space transmitter and the optical space transmission method can simultaneously reduce risk of eye injury without separately providing a structure for enhancing safety, and are useful for a transmission device and transmission method used in an optical space transmission system or the like for transmitting information data via a free space. Also, the optical space transmitter and the optical space transmission method are applicable for purposes of optical space transmission for a video signal, an audio signal, or the like, and a remote control or the like.

The invention claimed is:
1. A wavelength multiplexing optical space transmitter for multiplexing optical signals having a plurality of wavelengths and transmitting the multiplexed optical signal via a free space, the transmitter comprising:

a plurality of light sources for outputting lights each having a different wavelength, the plurality of light sources being arranged so as to provide a spatial area through which each of the lights pass; and a reflective type diffusion plate arranged such that at least a part of a surface thereof intersects the spatial area, for generating a diffuse light by reflecting and diffusing each of the lights entering from the plurality of light sources such that optical axes of the lights agree with each other, and for radiating the diffuse light as a multiplexed optical signal into the free space, wherein each of the plurality of light sources includes a light emitting element and a light source lens for converting an output light from the light emitting element into a substantially parallel light, wherein the wavelength multiplexing optical space transmitter further comprises a radiation lens provided separate from the reflective type diffusion plate, the radiation lens adjusting a spread angle of the diffuse light that enters the radiation lens, and wherein the radiation lens and the light source lens of each of the plurality of light sources are formed in one piece.

2. The wavelength multiplexing optical space transmitter according to claim 1, wherein the reflective type diffusion plate includes a light diffusing material for causing an output power of the diffuse light to be maximum in a direction perpendicular to a surface of the reflective type diffusion plate.

3. The wavelength multiplexing optical space transmitter according to claim 1, wherein the reflective type diffusion plate includes a light diffusing material for outputting the diffuse light with a light intensity distribution corresponding to a Lambertian distribution.

4. The wavelength multiplexing optical space transmitter according to claim 1, wherein the diffuse light outputted from the reflective type diffusion plate is radiated as the optical signal into the free space in a direction approximately perpendicular to a surface of the reflective type diffusion plate.

5. The wavelength multiplexing optical space transmitter according to claim 1, wherein the lights from the plurality of light sources enter the reflective type diffusion plate from a direction other than a range of directions approximately perpendicular to a surface of the reflective type diffusion plate.

6. The wavelength multiplexing optical space transmitter according to claim 1, further comprising a radiation lens provided separate from the reflective type diffusion plate, wherein the diffuse light is outputted so that the diffuse light is caused to enter the radiation lens and a spread angle of the diffuse light is adjusted thereby.

7. The wavelength multiplexing optical space transmitter according to claim 1, wherein the plurality of light sources are arranged in an approximate circle.

8. The wavelength multiplexing optical space transmitter according to claim 1, wherein the plurality of light sources include a light emitting element array having a plurality of light emitting sections that are unified and a lens array arranged correspondingly to the plurality of light emitting sections of the light emitting element array.

9. The wavelength multiplexing optical space transmitter according to claim 1, wherein the plurality of light sources are positioned such that optical axes of the lights entering the reflective type diffusion plate from the plurality of light sources are axially-asymmetric with respect to an axis passing through an area irradiated on the reflective type diffusion plate by the plurality of light sources and perpendicular to a surface of the reflective type diffusion plate.

10. The wavelength multiplexing optical space transmitter according to claim 1, wherein each of the lights outputted from the plurality of light sources has a far-field pattern of an ellipse shape, and the plurality of light sources are arranged so as to be tilted, with respect to an axis perpendicular to a surface of the reflective type diffusion plate, in a direction of a minor axis of the far-field pattern of the ellipse shape.

11. The wavelength multiplexing optical space transmitter according to claim 1, wherein a pair of light sources, among the plurality of light sources, are arranged in a direction such that polarization planes of the lights outputted from the plurality of light sources are orthogonal to each other, the pair of light sources being positioned substantially axially-symmetric to each other with respect to an axis which passes through an area irradiated on the reflective type diffusion plate by the plurality of light sources and is perpendicular to a surface of the reflective type diffusion plate.

12. A wavelength-multiplexing optical space transmission method for multiplexing optical signals having a plurality of wavelengths and transmitting the multiplexed optical signal via a free space, the method comprising:

an output step of outputting lights from a plurality of light sources, each of the lights having a different wavelength, such that at least a part of a surface of a reflective type diffusion plate is irradiated with the lights; and a diffusion step of: generating a diffuse light by reflecting and diffusing each of the lights entering the reflective type diffusion plate from the plurality of light sources by the reflective type diffusion plate such that optical axes of the lights agree with each other; and radiating the diffuse light as a multiplexed optical signal into the free space, wherein each of the plurality of light sources includes a light emitting element and a light source lens for converting an output light from the light emitting element into a substantially parallel light, wherein the wavelength-multiplexing optical space transmission method further comprises an adjusting step of adjusting a spread angle of the diffuse light that enters a radiation lens provided separate from the reflective type diffusion plate, and wherein the radiation lens and the light source lens of each of the plurality of light sources are formed in one piece.

* * * * *